Patented Sept. 24, 1935

2,015,104

UNITED STATES PATENT OFFICE 2,015,104

MANUFACTURE OF ORGANIC SUBSTITUTION DERIVATIVES OF CELLULOSE

Henry Dreyfus, London, England

No Drawing. Application November 12, 1930, Serial No. 495,137. In Great Britain December 2, 1929

15 Claims. (Cl. 260—101)

This invention relates to the manufacture of new cellulose derivatives and more particularly new cellulose derivatives containing nitrogen.

According to the present invention cellulose or materials containing cellulose or cellulose derivatives containing free hydroxy groups are treated with esterifying or etherifying agents containing the nitrile group, —CN. I have found that by these means valuable cellulose derivatives may be produced, which may be converted, e. g. by reduction or by hydration, into other valuable nitrogen containing cellulose derivatives. The nitrogen containing cellulose derivatives of the present invention have an affinity for acid wool dyes.

As examples of suitable agents for the manufacture of the new cellulose derivatives the following may be mentioned:—chlor-acetonitrile, cyanacetyl chloride, α- or β-chlor propionitrile or their homologues or derivatives.

I have found that the treatment of the cellulose with the nitrile-containing esterifying or etherifying agents may be carried out by methods analogous to those known for the manufacture of the ordinary esters or ethers of cellulose. The cellulose may be previously or simultaneously alkalized, for example with caustic soda or caustic potash. In the case of cyanacidyl halides the treatment may be effected in the presence of pyridine or other organic bases and in particular strong bases such as N-methyl piperidine, dimethyl-n-hexylamine, dimethyl aniline and the like. Inorganic alkalies are preferably employed in high concentration so as to obtain highly etherified or esterified derivatives. The invention does not, however, exclude the introduction of relatively low proportions of ether or ester group into the cellulose, for example proportions of the order of one ether group in one cellulose molecule, calculated on the $C_6$ formula, or even less. The caustic soda or caustic potash may, for example, be employed in a concentration of at least 45%, and preferably in sufficient quantity to form a saturated solution in any water which may be present. In the case of forming cellulose ethers I have found that particularly useful derivatives are obtainable by employing caustic soda in a proportion at least equal to 3 times the weight of any water present. The water is preferably present in a quantity less than 4 times the weight of the cellulose, and may be as low as 1½ or ½ times its weight or less. As an alternative the water may be wholly or in part replaced by organic liquids, e. g. alcohol, ether, benzene or toluene, and such media may be present in a large proportion so that the reaction is conducted in suspension.

As initial materials for treatment according to the present invention any desired cellulosic materials may be used, for example cotton cellulose or its near conversion products for example the regenerated cellulose obtained by the viscose process, or wood pulps, preferably chemical wood pulps, such as sulphite pulp, soda pulp or sulphate pulp from which the lignin, pentosan, resin and like constituents have been substantially removed. The invention further contemplates the treatment of cellulose derivatives containing free hydroxy groups, for example methyl, ethyl or other alkyl, or aralkyl, hydroxyalkyl or carboxyalkyl derivatives of cellulose or acetyl or other acidyl derivatives of cellulose, and it may be pointed out that the invention is of importance in the treatment of such materials since it enables mixed derivatives to be produced which while retaining the desirable properties of the known cellulose derivatives exhibit also an affinity for acid dyes. Such mixed derivatives may likewise be produced by treatment according to the present invention of a cellulose or cellulose containing material followed by etherification or esterification to introduce the other desired radicles.

The esterification or etherification characteristic of the invention may be effected as previously indicated by methods analogous to those used for the ordinary esters and ethers. For instance in the case of producing ethers the cellulose may be kneaded with caustic alkali solution or may be first moistened with the desired amount of water and powdered caustic alkali kneaded in. The alkalized cellulose may then be treated with chlor acetonitrile, for example, dissolved in a suitable solvent. Again in the case of producing cellulose esters the cellulose may be treated in suspension with cyanacetyl chloride, for instance, in presence of a base and preferably a strong base such as a methyl piperidine or dimethyl-n-hexylamine. The treatment may be carried out in two or more stages, either the base, organic or inorganic, or the etherifying or esterifying agent being brought to reaction with the cellulose in portions.

The invention includes also the production of mixed etheresters of cellulose by treating the cellulose simultaneously or separately with a nitrile-containing etherifying agent and a nitrile-containing esterifying agent.

As previously indicated, a further important feature of the invention comprises the conversion of the new nitrile-containing cellulose derivatives into other nitrogen containing derivatives of cellulose. For example the new derivatives may be treated with reducing agents, e. g. with sodium amalgam in boiling alcohol or boiling aqueous alcohol, to produce the corresponding amino derivatives of cellulose. Again the nitrile-containing cellulose derivatives may be hydrated or hydrolyzed, for example by boiling with water under pressure or by boiling with water in presence of catalysts, such as hydrochloric acid or hydrogen peroxide or hydrogen peroxide in conjunction with sodium peroxide, to obtain bodies of a similar type to those produced according to British application No. 36474/29 dated 28th November, 1929 corresponding to U. S. application S. No. 492,363 filed October 30, 1930 in which amino groups are substituted for hydroxy groups in cellulose derivatives containing the same in the form of carboxy groups. As stated in that specification the said derivatives may be treated with hypochlorites, hypobromites and the like to obtain simple amino derivatives. By carrying the hydration still further the corresponding carboxy derivatives may be obtained, for example carboxy-methyl cellulose or cellulose glycollic acid or carboxy-acetyl cellulose or cellulose malonate.

Any cellulose derivatives produced according to the present invention which contain primary or secondary amino groups may be alkylated, aralkylated or acylated, for instance by treatment with an alkyl or aralkyl halide or an acidyl chloride or anhydride.

The following examples show the best methods known to me for carrying the invention into effect, but they are not to be considered as limiting it in any way:—

*Example 1*

162 parts of cotton linters or purified wood pulp are suspended in a mixture of 500 parts of dimethyl-n-hexylamine and 300 parts of nitrobenzene and a solution of 350 parts of cyanacetyl chloride in a further 1000 parts of nitrobenzene is added slowly while keeping the temperature at between 80 and 90° C. After 1 to 2 hours or when there is no further evolution of heat, the cellulose derivative produced is separated from the reaction mixture and washed with alcohol. It is soluble in glacial acetic acid and acetylene tetrachloride and is insoluble in alcohol, ether and water.

*Example 2*

162 parts of cotton linters or purified wood pulp are treated with a mixture of 100 parts of cyanacetyl chloride, 120 parts of dimethyl-n-hexylamine and 1000 parts of glacial acetic acid. When the reaction is complete a mixture of 250 parts of acetic anhydride, 200 parts of acetic acid and 16–20 parts of sulphuric acid are added, the reaction mixture being then cooled so as to maintain a temperature of 15 to 25° C. When solution is complete, the mixed cellulose derivative may be precipitated therefrom by addition of water, ether or other non-solvent or may be ripened in solution as is usual in the cellulose acetate art.

*Example 3*

162 parts of cotton linters or purified wood pulp are impregnated with 320 parts of a 50% aqueous solution of caustic soda, the whole being kneaded together for about 2 hours. At the end of this period 150 to 225 parts of chloracetonitrile are added, the mass being kneaded for a further 2 to 3 hours at a temperature which may vary between ordinary temperature and 60° C. A further 240 parts of powdered caustic soda are then worked in and subsequently 250 parts of chloracetonitrile, the temperature of the reaction being then carried to 50–100° C. A further etherification step may then be applied with an additional 160 parts of caustic soda and 200 parts of chloracetonitrile. At the end of the reaction, the product is washed free from reagents and dried. It is soluble in glacial acetic acid and insoluble in ether.

*Example 4*

100 parts of the product obtained according to Example 1 or 3 is treated with about 100 parts of a "20 volume" solution of hydrogen peroxide. After a short time 15–20 parts of sodium peroxide are added with stirring or kneading, the addition being sufficiently gradual to prevent undue rise of temperature and cooling being applied if necessary so that the temperature does not exceed about 35–40° C. When the evolution of oxygen has ceased, gentle heat is applied for a short time and the products then cooled and washed with water. The products are soluble in aqueous acetone and acetic acid and in fact are similar in properties to those obtained according to British application No. 36474/29 dated 28th November, 1929 corresponding to U. S. application S. No. 492,363 filed October 30, 1930 by heating the ammonium salt of cellulose glycollic acid or of cellulose malonate or by treating with ammonia the chlorination products of these cellulose derivatives. They exhibit a pronounced affinity for acid dyesuffs. The products contain nitrogen and may be alkylated, aralyklated or acylated by known methods.

The hydrolysis or hydration may be carried still further by means of moderately concentrated or concentrated mineral acids. Thus the product obtained according to Example 3 may be gently warmed at about 40–50° C. with 20–25% aqueous hydrochloric acid or with 30–40% aqueous sulphuric acid, when products are obtained which are more soluble in aqueous reagents, e. g. 50% acetone or 50% alcohol, than are the products obtained with hydrogen peroxide. By continuing the treatments, say from 3–6 hours, the nitrogen content of the cellulose derivative continually diminishes. The product, which is at least partly soluble in aqueous alkali, probably contains free carboxylic acid groups.

*Example 5*

The product obtained according to Example 3 is suspended in 10 times its weight of amyl alcohol and the whole heated until just short of boiling temperature. Sodium in the form of a 10% amalgam is then added gradually during 2 hours until the total quantity of sodium added is about 0.5 to 0.75 times the weight of the cellulose derivative used. The liquor is then boiled for half an hour, cooled and the cellulose derivative separated and washed with aqueous alcohol. It has an affinity for acid dyestuffs more pronounced than the products of Example 4.

What I claim and desire to secure by Letters Patent is:—

1. Process for the production of new cellulose derivatives, which comprises treating cellulose with halogen containing substitution agents which contain the radicle $$-C \cdot C \vdots N$$

2. Process for the production of new cellulose derivatives, which comprises treating cellulose with halogen containing esterifying agents which contain the radicle $$-C \cdot C \vdots N$$

3. Process for the production of new cellulose derivatives, which comprises treating cellulose with halogen containing etherifying agents which contain the radicle $$-C \cdot C \vdots N$$

4. Process for the production of new cellulose derivatives, which comprises treating cellulose with halogen containing substitution agents which contain the radicle $$-C \cdot C \vdots N$$

in the presence of a strong base.

5. Process for the production of new cellulose derivatives, which comprises treating cellulose with halogen containing esterifying agents which contain the radicle $$-C \cdot C \vdots N$$

in the presence of a strong organic base.

6. Process for the production of new cellulose derivatives, which comprises treating cellulose with halogen containing esterifying agents which contain the radicle $$-C \cdot C \vdots N$$

in the presence of caustic alkali.

7. Process for the production of new cellulose derivatives, which comprises treating cellulose with halogen containing substitution agents which contain the radicle $$-C \cdot C \vdots N$$

and reducing the product.

8. Process for the production of new cellulose derivatives, which comprises treating cellulose with halogen containing substitution agents which contain the radicle $$-C \cdot C \vdots N$$

and hydrolyzing the product.

9. Process for the production of new cellulose derivatives, which comprises treating cellulose with halogen containing esterifying agents which contain the radicle $$-C \cdot C \vdots N$$

and reducing the product.

10. Process for the production of new cellulose derivatives, which comprises treating cellulose with halogen containing esterifying agents which contain the radicle $$-C \cdot C \vdots N$$

and hydrolyzing the product.

11. Process for the production of new cellulose derivatives, which comprises treating cellulose with halogen containing etherifying agents which contain the radicle $$-C \cdot C \vdots N$$

and reducing the product.

12. Process for the production of new cellulose derivatives, which comprises treating cellulose with halogen containing etherifying agents which contain the radicle $$-C \cdot C \vdots N$$

and hydrolyzing the product.

13. Organic substitution derivatives of cellulose containing the radicle $$-C \cdot C \vdots N$$

14. Cellulose esters containing the radicle $$-C \cdot C \vdots N$$

15. Cellulose ethers containing the radicle $$-C \cdot C \vdots N$$

HENRY DREYFUS.